INVENTORS
ROBERT W. ASTHEIMER
MONTY M. MERLEN
ATTORNEY

United States Patent Office 2,961,545
Patented Nov. 22, 1960

2,961,545

TRACKER FOR MOVING OBJECTS

Robert W. Astheimer, Westport, and Monty M. Merlen, Stamford, Conn., assignors to Barnes Engineering Company, Stamford, Conn., a corporation of Delaware Filed Oct. 23, 1959, Ser. No. 848,296

8 Claims. (Cl. 250—203)

This invention relates to an improved tracker of the passive type for tracking a rapidly moving target which emits infrared radiation. One of the fields of use of this invention is the tracking of rockets.

The tracking of rapidly moving targets for example, a rocket, a fast jet airplane and the like presents serious problems close to the ground. Because in such instances radar tracking is unreliable due to interference from the ground and for other reasons.

The present invention deals with a passive optical tracker using infrared radiations and producing electrical error signals when the tracker aiming mechanism has not aimed the tracker directly at the object. These electrical signals then actuate suitable servo mechanisms for aiming the tracker at the target and for maintaining it on the target. The servo mechanisms are well known and it is an advantage of the present invention that standard servo mechanisms such as those used for the radar tracking of Nike type rockets may be used without significant modification. The advantage of using standard servo mechanisms is a very real one because it not only permits reduction in cost but it permits the use of the tracker of the present invention in a so-called compatible system with the radar tracker. Thus, for example, when tracking either a rocket or other rapidly moving vehicle it is desirable that the infrared tracker and the radar tracker be capable of working on the same servo mechanisms so that tracking can be transferred at will from one system to the other. For example, in the case of a rocket, the initial tracking, when the altitude is low, can be by infrared and radar can then take over when a suitable altitude has been reached. In the case of rapidly flying airplanes the reverse would be true usually for radar could pick up the plane at a distance and then switch over smoothly to the infrared tracking at the point where the proximity of the moving object to the earth became sufficiently great so that radar tracking lost reliability. While the possibility of compatible systems is a very important one it should be understood that the present invention is not limited to any special design of servo mechanism. Putting it another way the function of the present invention ceases once the electrical signals have left the mechanism.

Before more detailed description of the present invention some further discussion of the problems of a passive radiation sensitive tracker is desired for it is in the solution of some of these problems that much of the advantage of the present invention lies. The general idea of tracking by means of a radiation sensitive tracker which actuates various detectors for altitude and azimuth variation is not a new thing but such trackers have had serious difficulties and do not solve completely all of the problems encountered. In order to simplify further discussion infrared trackers will be dealt with. Some of the principles are applicable to shorter wavelength radiation. In fact the device is useful with any type of radiation which is short enough to obey accurately the laws of geometrical optics and which in the specification and claims will be referred to as "optical radiations." However, the problems in practical use make a tracker operating on infrared radiations preferable and this is therefore the preferred embodiment of the present invention.

A passive optical tracker is affected by transmission characteristics of the atmosphere where it is to be used within the earth's atmosphere. Because certain infrared bands are comparatively unaffected by atmospheric changes such as water vapor content and the like and it is desirable to use a band of infrared radiation within one of the so-called "atmospheric windows." The infrared region from $1.8\mu$ to about $2.5\mu$ presents many advantages. Since the principles of the present invention are applicable to radiations of this wavelength this may be considered a preferred embodiment.

A very serious problem in optical tracking, as well as certain other types of tracking, is that there are two conflicting problems. First, to simplify acquiring a fast moving target, a large field of view is required, so the tracker only has to be pointed in the approximate direction of the target, instead of exactly at it. The pointing accuracy of the tracker during this phase of its operation is not of paramount importance. All that is required, after the target presence is detected, is that the servo be driven rapidly to bring the target image towards the center area of the tracker's field of view. When the acquisition problem is solved in the best manner it leads to a worsening of a second problem which is equally important and which has constituted a serious dilemma. When the tracker is rapidly moved it acquires considerable momentum and so over-shoots and this hunting very seriously interferes with the accuracy with which a tracker remains locked on its target after it is acquired.

It is necessary for the tracker to point accurately at the target only after acquisition is accomplished. Then, for good pointing accuracy, a small field of view is more desirable than a large field of view. In general, a tracker's pointing accuracy is better when the total field of view is small, instead of large. For one thing a target's position in a field of view is generally determinable as a percentage of a the total field of view. In addition, a small field of view, as opposed to a large field of view, will see less background, and thus there will be less possibility of spurious signals, as from clouds, causing interference with the desired target signal. It is also very important that hunting be reduced to a minimum. As will appear below the present invention solves all of these problems without requiring any compromise.

Another problem which arises only when the tracker is used under circumstances in which it might occasionally pick up the sun is the enormous energy output of sunlight against which the instrument must be protected. This subsidiary problem is also fully and satisfactory solved by the present invention.

Essentially the present invention consists of four infrared detectors 90° apart, one serving as a coarse or wide field detector for elevation, another similarly for azimuth and finally two others for fine, precise tracking with a maximum protection against hunting. Radiation to each of the acquisition or coarse detectors is interrupted at different frequencies depending on whether the target is off center in one direction or the other. The fine or tracking detectors preferably receive radiation interrupted at a different frequency and are associated with electronic circuits producing a very fast but proportional signal which decreases down to zero as the target approaches the central position. Such a signal provides a maximum protection against hunting and at the same time enables the tracker to follow a rapidly and erratically moving target.

The invention will be described in greater detail in conjunction with the drawings which illustrate a typical device operating on infrared radiation in the 1.8 to 2.5μ band.

Figure 3:
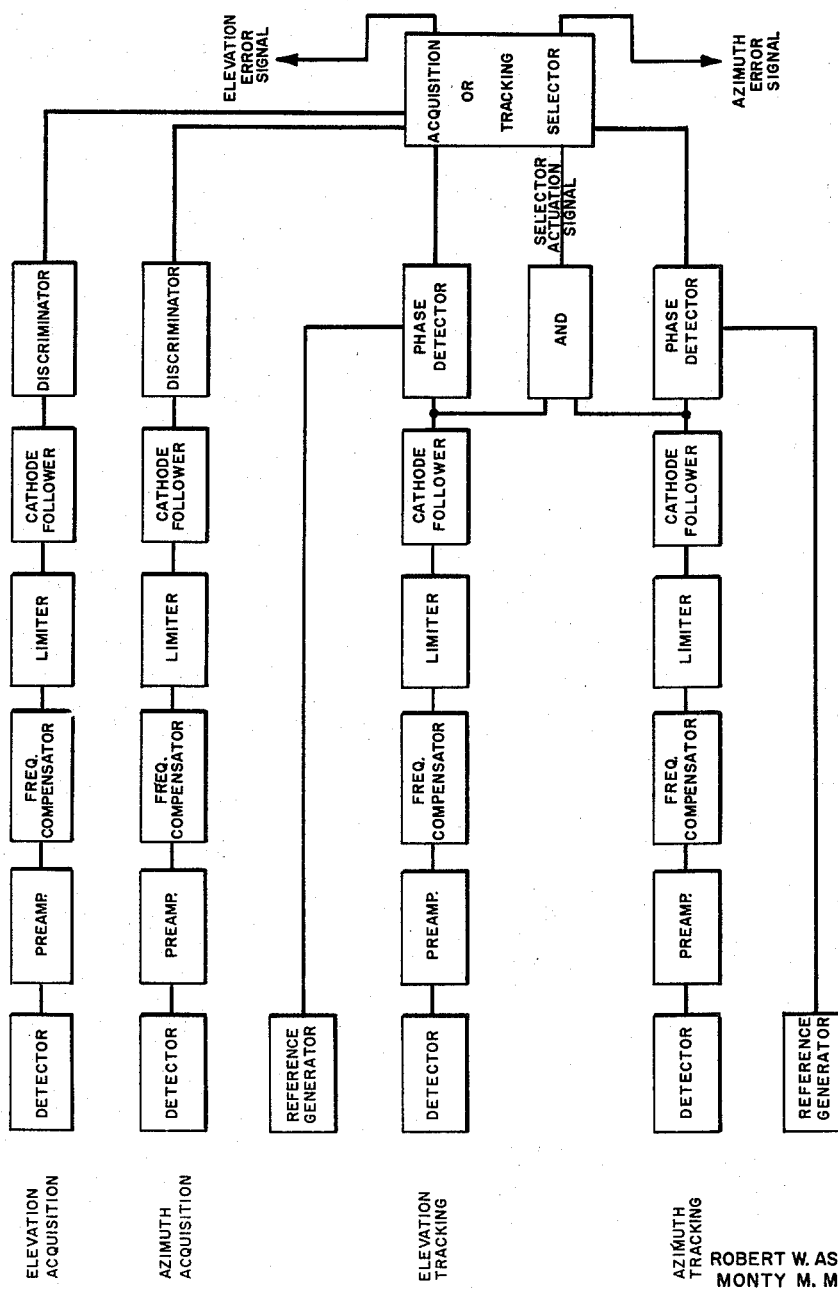
Fig. 3 is a block diagram of the electronic circuits.
Figure 4A:
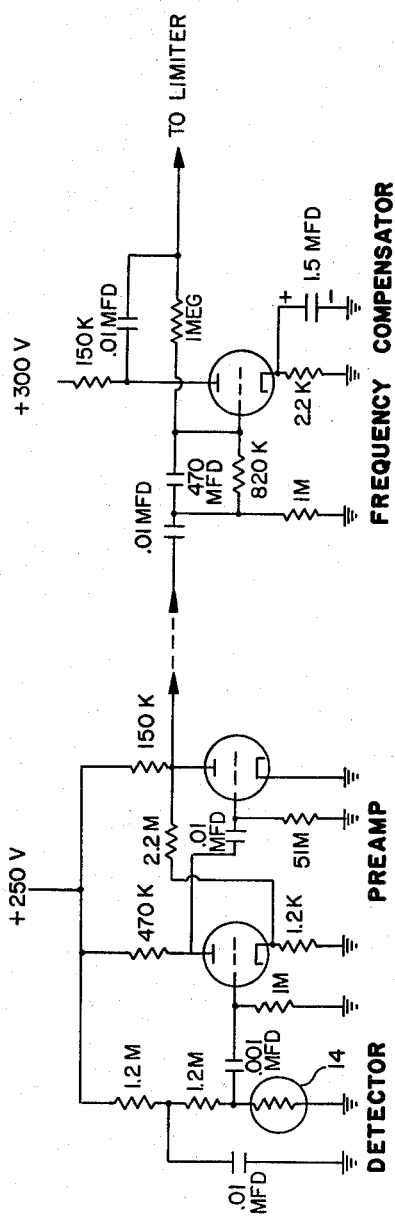
Figure 4A:
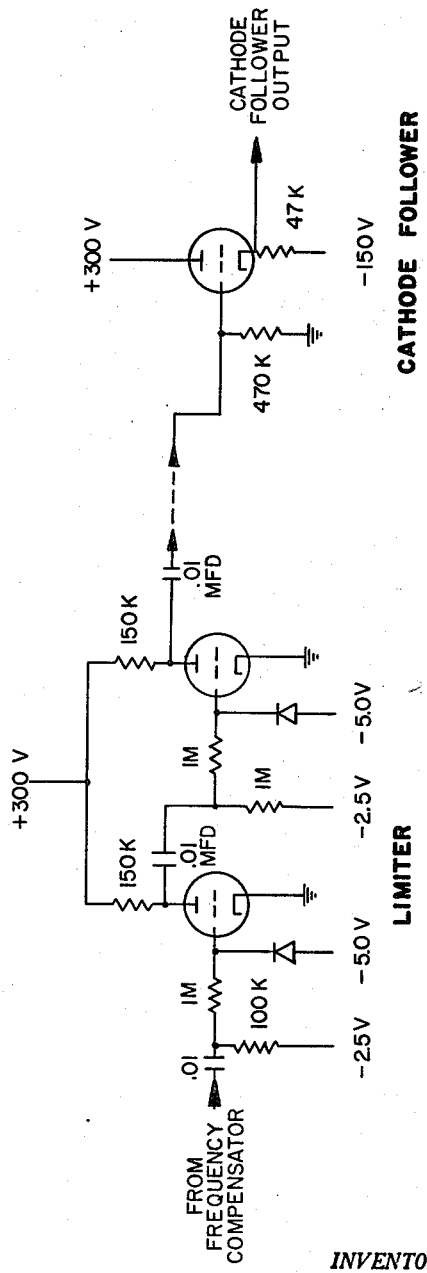

Figs. 4A, B, and C constitute a typical schematic of the circuits of Fig. 3.

Figure 1:
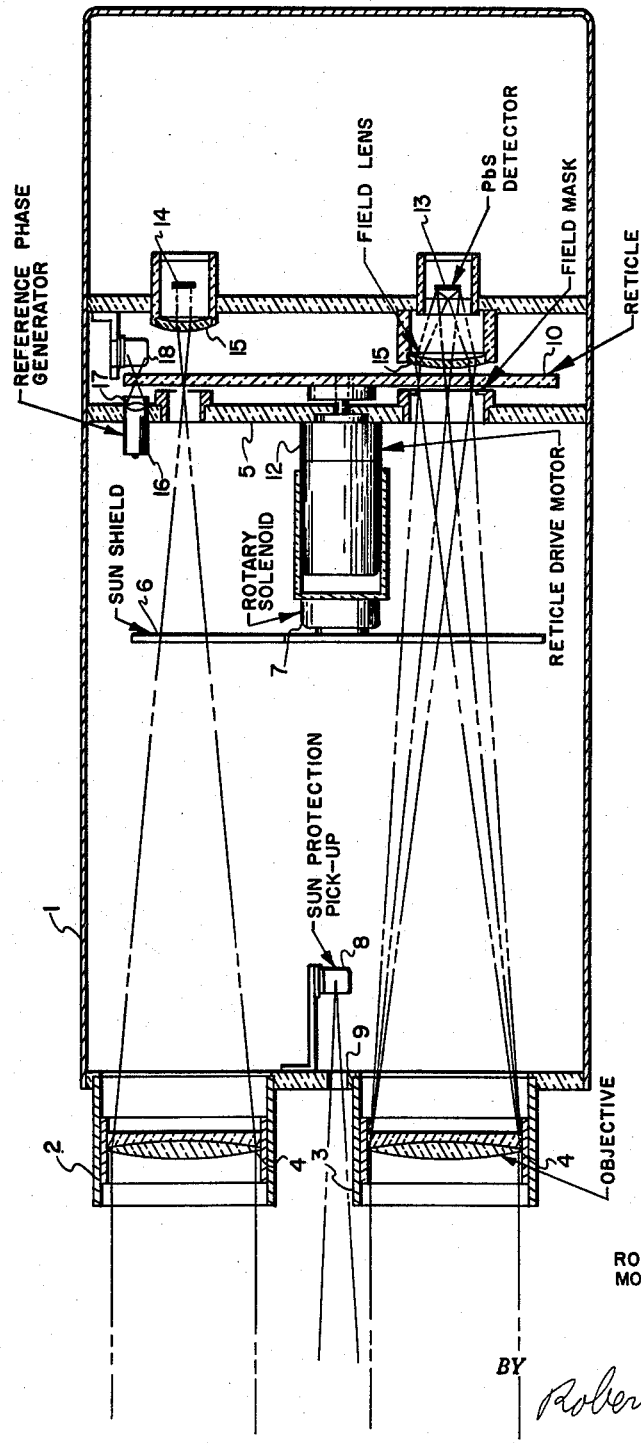
Fig. 1 is a section through the instrument showing one coarse or finding detector and one fine tracking detector.

In Fig. 1 the instrument is housed in a casing 1 provided with four lens mounts 2 and 3. Lens mount 2 serves one of the locking or tracking detectors and lens mount 3 serves the corresponding finding or acquisition detector. Each of the lens mounts contains an objective lens 4 of suitable material, for the 1.8 to 2.5μ band arsenic sulfide glass. A baffle 5 is provided with four openings for the radiation passing through the objectives 4. In front of the baffle is a sun shield 6 operated by a rotary solenoid 7 which in turn is actuated by a radiation detector 8 receiving radiations on the central axis of the instrument through a small opening 9.

The beams from the four objectives 4 pass through a rotating reticle 10 which is made of a glass having suitable transmission in the infrared band from 1.8 to 2.5μ.

Figure 2:
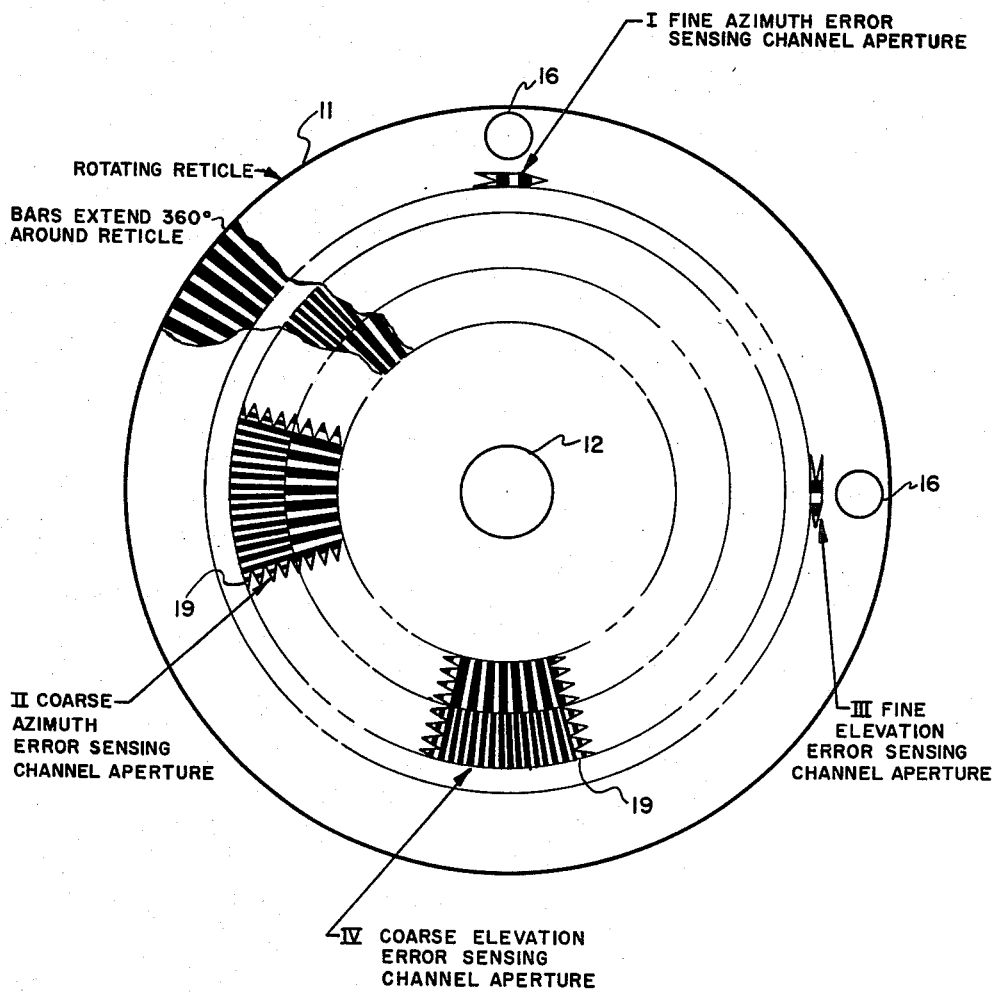
Fig. 2 is a plan view of the rotating reticle in Fig. 1 showing both pairs of detectors.

The reticle is shown in Fig. 2 and is provided with a mask 11 having four openings, two for each of the acquisition objective lenses having a wide field of view, at least 4° on a side and two for the tracking detectors. Three circles of etched bars are provided with two inner ones extending through the mask openings for the two acquisition detectors and the outer one extending from the small mask openings for the two tracking detectors out to the periphery of the reticle. For convenience in showing the bars, a portion of the mask 11 is shown broken away in Fig. 2 at the upper left-hand corner so that all three concentric circles of bars appear. The reticle is rotated by means of a synchronous electric motor 12.

The beams from the objectives 4, after passing through the reticle 10 in the clear intervals between the bars, are imaged on the acquisition detectors 13 and tracking detectors 14 by germanium field lenses 15. Two reference lights 16 shine lights, focused by the lenses 17 through the bars at the extreme edge of the reticle 10. The beams are focused on detectors 18 which serves as reference phase generators. The function of these generators will be described in greater detail below in connection with the discussion of the operation of the instrument and associated electronic circuits.

While the invention is not limited to particular exact dimensions, in a typical rocket tracker illustrated on the drawing the objectives 4 are approximately 2″ in diameter and of 10″ focal length. The field lenses are smaller as shown in Fig. 1. The detectors, which for the particular infrared band are lead sulfide, are square detectors 4 x 4 mm. Turning to Fig. 2 it will be seen that the bars in each of the three circles are of different angular widths. In order to produce a tracking accuracy of better than 0.25 milliradian the mask openings for the fine tracking is 0.075 in a radial direction. With the focal length of the objectives 4 referred to above this dimension corresponds to 7.5 milliradians. In order to prevent chopping of the sky or other relatively large diffuse radiation sources it is necessary that an integral number of pairs of bars and clear openings on the reticle be accommodated in any one mask opening if the side edges are straight radial lines. For the tracking detector opening shown in Fig. 2 the number is two pairs. With a 600 r.p.m. motor this results in chopping the beam at a frequency of 1,000 cps.

A serious problem is encountered due to the fact that the sky surrounding a target may be quite bright. It is important, therefore, that the chopped radiation from the background does not appear as a signal. The aperture of each window which includes an integral number of pairs of bars and clear spaces is one means to prevent chopping of the background radiation. However, in a practical device it is not the best method because it would operate perfectly only if the edges of the aperture mask are radially straight and subtend exactly an integral number of pairs. Since departures from perfect edges as little as a thousandth of an inch can produce disturbing signals, the edges of the apertures are provided with saw teeth 19. If the saw teeth are of such length that they extend across an integral number of pairs of bars and clear spaces and the edges of saw teeth on one side of an aperture are parallel to the corresponding teeth on the opposite side, there will be no chopping of the background regardless of the aperture size. This important effect is not claimed per se in the present application as it constitutes the subject matter of the copending application of Monty M. Merlen, Serial No. 862,397, filed December 28, 1959. However, in the present application the saw tooth construction is shown as it constitutes the best method of avoiding unwanted signals from backgrounds.

It should be noted that the dimensions of the saw teeth apply only to the bars and clear spaces of the particular ring for which they constitute aperture edges. In other words, the teeth at the edge of the apertures for the acquisition detectors could be of different lengths for the two different rings. However, it is convenient to have the aperture bounded by saw teeth of uniform length and this is illustrated in Fig. 2, the bars being so chosen that they are half as wide in the central band as in the inmost circle. As a result the saw teeth can be chosen and are shown as extending over one pair of bars and spaces in the inmost circle which makes them extend over two pairs in the central circle thus, fulfilling the required condition that they cover an integral number of pairs.

The purpose of the bars on the reticle in the larger mask openings for the acquisition detectors is to generate a different frequency when the target is one side or other of the direct line of sight. The number of bars and the hence the frequencies may be arbitrarily chosen except, of course, that the same provision is necessary that the mask opening and saw teeth shall include an integral number of pairs of bars and openings. In Fig. 2 the bars of the inmost circle chop the beams at 750 cps and those of the central band at 1500 cps.

When the target is sufficiently close so that it is on the imaged fine tracking detector there would still be a signal coming from the acquisition detectors which might be confusing and so is cut off. This can be done optically by a suitable opaque band between the two series of bars but it is better to do it electrically as false target signals and noise are also eliminated from the acquisition channels. This will be described in connection with the electronic circuits which are so arranged that when the target image strikes both tracking detectors this cuts off signals of the acquisition detectors.

The electronic circuits, although each is standard in design, are arranged to perform a particular overall function. They are in the block diagram in Fig. 3. Each of the four detectors is provided with an amplifier which has a suitable bandwidth, for example, the amplifiers for acquisition must have a bandwidth sufficiently wide to pass both the 750 and 1500 cycle signals. The tracking detector amplifiers can have a narrower band pass close to the 1000 cycle signal of these beams. The amplifiers can be either of vacuum tube or transistor type.

For a sharp resolution the signal from the detectors should be square waves. However, the response of the lead sulfide detectors, and as a matter of fact most other infrared detectors, is by no means instantaneous. This results in square waves with rounded leading and trailing edges and so frequency compensating amplifiers are used, in each case the characteristics of the amplifier being such that it produces an output in which the edges of the square waves are much steeper. These circuits are also standard in design as the problem of reducing the rise time in square wave circuits is quite a common one and the compensatory circuits are well known.

The tracker has to operate from radiation sources which may vary enormously. In order, therefore, to prevent complications arising from amplitude modulation limiters are introduced which are of standard design and which slice off all but the first 0.1 volt of signal. As a result there is no substantial difference in output from targets having radiation sources varying greatly within the limits of the design parameters of the limiter. Conventional cathode followers isolate the limiters from the other circuits but from here the nature of the two types of circuits, namely the acquisition and the tracking, is different. In the case of the acquisition amplifier it is desirable to operate servos at full speed the instant there is any change of frequency, so that response is immediate at the maximum slewing rate of the tracker. Accordingly discriminating circuits are used which give a signal that depends only on which of the two chopping frequencies is present.

The tracking circuits after the cathode followers require different treatment. The lights of the reference generator are chopped at 1000 cycles forming fixed reference signals which with the detector signals are fed to phase detecting circuits of standard design. This phase detection is an important advantage of the present invention as it not only simplifies circuitry, eliminating all subcarriers, but also provides an extremely rapid and accurate response.

The outputs of the phase detecting circuits are proportional to the spacial displacement between the target image and the light source in the reference generator. When the light source in the reference generator is properly located these signals will be proportional to the displacement of the target from the center of the tracking field. As a result the servos slow down their tracking rate as they approach zero tracking error which eliminates any tendency to hunt. At the same time the target signal into the phase detector circuit actuates gates so that when the target comes in both fine tracking zones the coarse acquisition tracking is shut off. In Fig. 3 all of these functions are shown in a single circuit block at the right, though of course two pairs of different circuit elements are actually present. Circuitry is standard in every respect and is stable, introducing no problem in the operation of the device of the present invention.

A typical schematic of the circuits shown in Fig. 3 appears in Figs. 4A, B, and C. The schematic is that used in the infrared portion of the tracker which has been operating at Cape Canaveral. The schematics of the circuits shown are complete with values of components and voltages but the conventional power supply and filament wiring is not shown.

Since in Fig. 3 the elements and circuits down to the output of the cathode followers are identical in each of the four channels, only one set is shown in Fig. 4A. There is also shown a schematic of one of the pair of discriminators, reference generators and phase detectors in Fig. 4B. The acquisition or tracking selector circuit and the AND circuit show the inputs from the corresponding element of each of the channels which are duplicated.

Fig. 4A illustrates the schematic of the detector, preamplifier, frequency compensator, limiter, and cathode follower of one channel. The circuits are of straight forward design and their operation is self-evident from the voltages and component values given. The abbreviations K and M are used, as is customary, to represent kilohms and megohms.

Figure 4B:
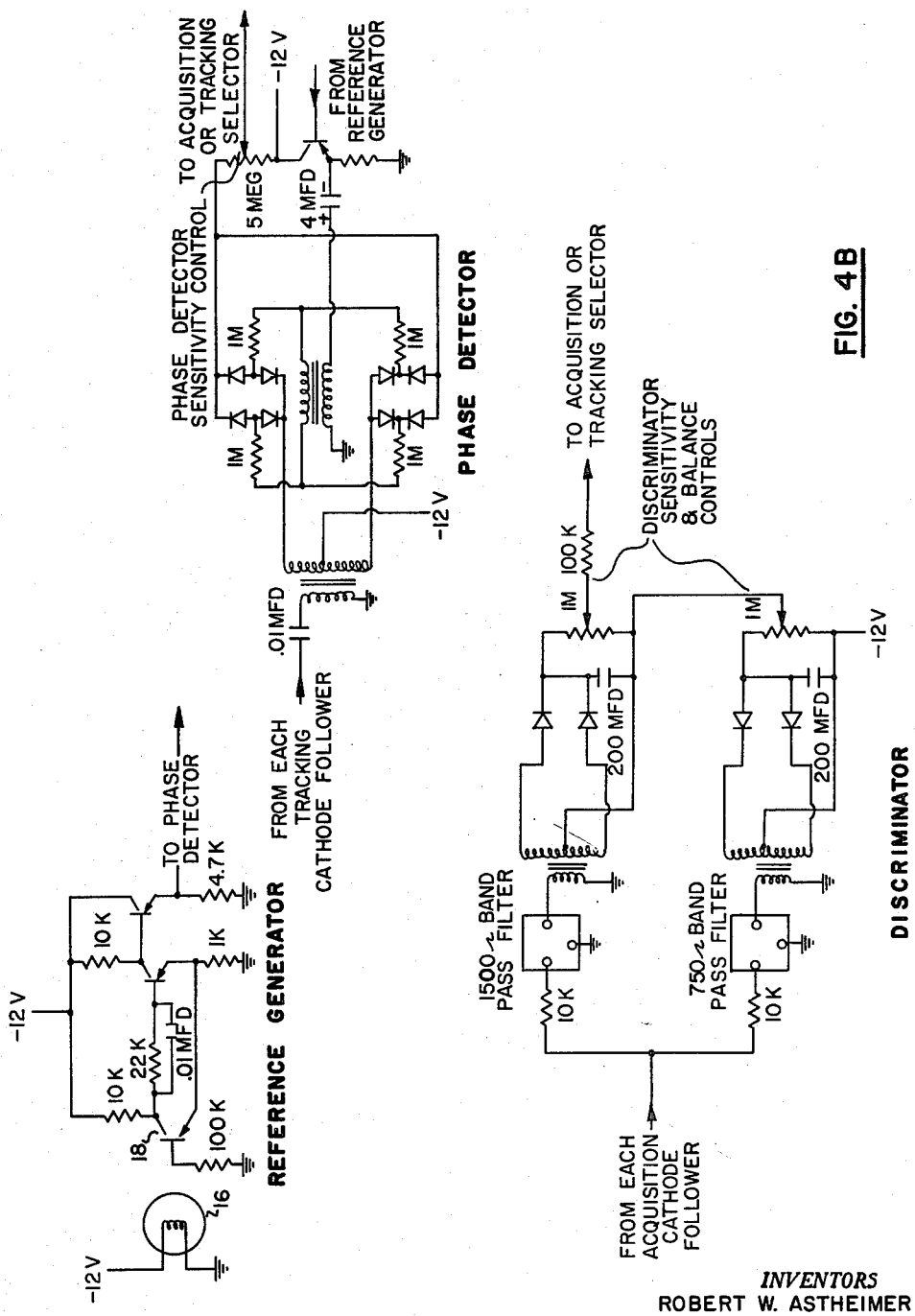

Fig. 4B shows a schematic of one of the pair of discriminators used. These are of the common band pass filter type. This figure also shows the schematic of a tracking channel phase detector together with the corresponding phase generator. The light source 16 and phototransistor 18 carry the reference numerals of corresponding parts in Fig. 1 as does the detector 14 in Fig. 4A.

Figure 4C:
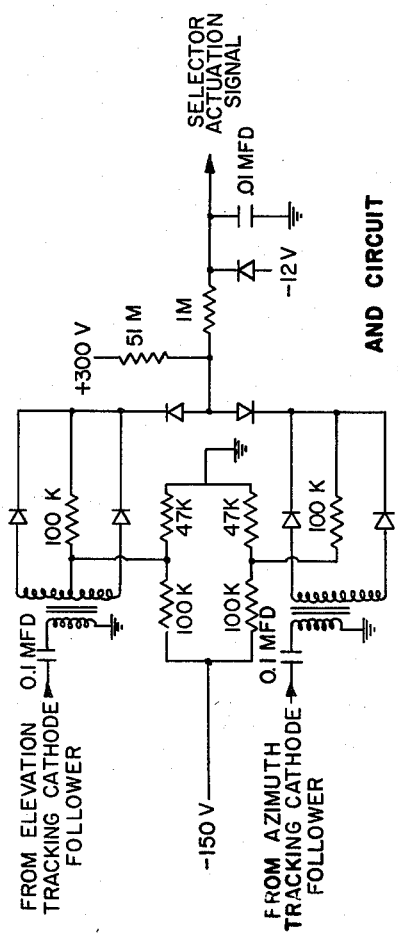
Figure 4C:
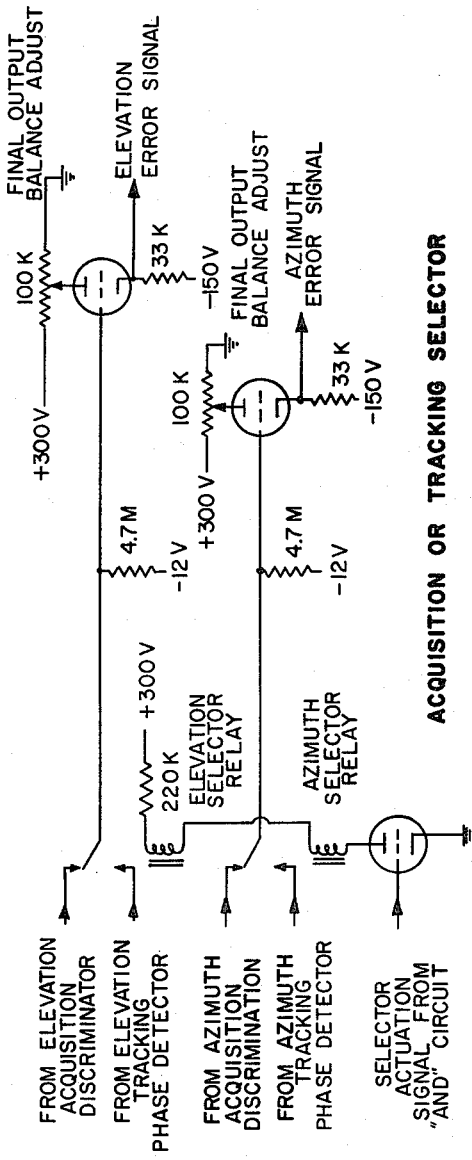

Fig. 4C shows the acquisition or tracking selector and the AND circuit. The former shows the inputs from both tracking phase detectors and acquisition discriminators together with the outputs which constitute the final elevation and azimuth error signals. A switching tube appearing in the lower left hand corner of the selector schematic actuates the two switching relays. When this tube is cut off by a high negative bias on the grid the two switches are shown in the position connecting the acquisition discriminators to the cathode followers of the selector. The AND circuit appearing on the same figure receives inputs from the cathode followers of both tracking channels. If it receives no signal from either channel or a signal from only one, then it will be apparent that a high negative output voltage results which, when applied to the grid of the switching tube of the selector, cuts off this tube. If, however, there are signals from both tracking channel cathode followers, it will be seen that there is a net positive voltage applied to the grid of the switching tube in the selector which latter actuates the two switching relays and connects the outputs from the two tracking phase detectors to the selector cathode followers.

A portion of the voltage produced by the tracking detectors and amplifiers may be used as an indicating signal so that when the operator wishes to shift from infrared to radar tracking or vice versa he knows when the tracker is close to being exactly on target.

The tracker has been described in conjunction with refractive optics, i.e., lenses and objectives. This permits a very compact design and is preferred. It should be understood, however, that the invention can use any optics which will focus the beam on the detectors and in certain instances where higher energy pickup is desirable or where achromatic operation over a wide spectral band is of importance, reflective optics of standard infrared radiometer design may be used. They are much more bulky than the lenses but permit a higher energy pick up from distant sources. The instrument of the present invention should, therefore, not be considered in its broader aspects to be limited to any particular kind of optical components and it is advantageous that the essential elements including the rotating reticle and detector arrangements may be used with a wide variety of optics to permit the most effective design for any particular condition.

We claim:

1. In a device for tracking moving objects by optical radiation emitted from said objects and comprising servo actuated aiming means including at least one radiation detector for elevation and one for azimuth and optical systems imaging beams from the target thereon, the improvement which comprises two pairs of radiation detectors for elevation and for azimuth respectively, each pair consisting of a coarse or acquisition detector and a fine or tracking detector, said detector pairs being arranged at 90° to each other around a circle, the acquisition detectors being at one radial distance from the center of the circle and the tracking detectors at a different one, a rotating reticle in the optical beams in front of the detectors, said reticle being provided with three concentric bands of uniform opaque and transparent bars, one band registering with the tracking detectors and two contiguous bands the joining line of which registers with the acquisition detectors, the number of bars in the contiguous bands being different whereby the beams striking the tracking detectors are chopped at one predetermined frequency and the beams contacting the acquisition detectors are chopped at either of two frequencies, a mask in front of said rotating reticle having relatively large openings in front of the acquisition detectors and narrow openings in front of the tracking detectors the dimensions of the mask openings and their edges being such that in the case of each of the bands no chopping of background radiation results, electronic circuits receiving the outputs from the detectors, the circuits receiving output from the acquisition detectors including discriminator elements whereby they produce an output signal of one type at one frequency and another at the other, the electronic circuits receiving signal from the tracking detectors including phase detecting elements, reference phase generators connected to the phase detecting elements whereby an output signal is produced which varies with the departure from center of the image on the tracking detectors and being zero at center and means for suppressing output signals of the circuits for the acquisition detectors when the tracking detectors receive radiation.

2. An instrument according to claim 1 in which the reference phase detectors comprise light sources and detectors and means for directing the beam from said light source through the bend of bars on the reticle which interrupt radiation to the tracking detectors.

3. A device according to claim 1 in which radiation detecting means is located on the instrument and means actuated from said radiation detecting means for interrupting radiation to the detectors when the radiation source exceeds a predetermined intensity.

4. A device according to claim 3 in which the interrupting means is a rotatable shield in front of the reticle mask the actuating means is a rotational solenoid.

5. A device according to claim 1 in which the means for interrupting signals from the acquisition detectors when the tracking detectors are irradiated comprises electrical gates in the acquisition detector circuits and means for actuating said gates from a portion of the signal from tracking detector circuits.

6. In a device for tracking moving objects by optical radiation emitted from said obects and comprising servo actuated aiming means including at least one radiation detector for elevation and one for azimuth and optical systems imaging beams from the target thereon, the improvement which comprises aperturing means in the optical systems passing two wide fields of view to an elevation and azimuth detector respectively, means for interrupting the radiation in one side of each field at one frequency and the other side at a second, electronic amplifying means receiving signals from said elevation and azimuth detectors, said amplifying means including discriminating elements producing one signal output for one frequency and a different one for the other, aperturing means in the optical systems passing two narrow fields of view one to an elevation detector and one to an azimuth detector, means for interrupting the beams in said narrow fields of view at a predetermined frequency, means for generating reference phase signals, electronic amplifying means receiving signals from said elevation and azimuth detectors and from the reference phase signal generators, said amplifying means having rapid response phase detecting elements whereby signals are produced from the detectors receiving the narrow field radiation in proportion to the spacial displacement of the target image, and means actuated by both of said latter amplifiers for shutting off signal from the detectors receiving beams through the wide field apertures.

7. A device according to claim 6 in which the aperture edges and dimensions are selected to eliminate interruption of background radiation at the frequencies involved.

8. A device according to claim 7 in which the beam interrupting means comprises a uniformly rotating reticle with a plurality of rings of bars and clear spaces.

No references cited.